United States Patent [19]

Takamori et al.

[11] Patent Number: 5,568,459
[45] Date of Patent: Oct. 22, 1996

[54] OPTICAL DISK APPARATUS AND OPTICAL DISK HAVING A HARD ADDRESS MARK AREA

[75] Inventors: Hiroki Takamori; Masahiro Honjo, both of Osaka, Japan

[73] Assignee: Matsushita Electric Industrial Co., Ltd., Osaka, Japan

[21] Appl. No.: 587,827

[22] Filed: Jan. 11, 1996

Related U.S. Application Data

[63] Continuation of Ser. No. 198,619, Feb. 18, 1994, abandoned.

[30] Foreign Application Priority Data

Feb. 18, 1993 [JP] Japan ..................... 5-028745

[51] Int. Cl.$^6$ ............................................. G11B 7/00
[52] U.S. Cl. ............................ 369/50; 369/47; 369/275.3
[58] Field of Search ............................ 369/275.1, 275.2, 369/275.3, 275.4, 32, 44.13, 44.26, 47, 50, 51, 56, 58, 44.32

[56] References Cited

U.S. PATENT DOCUMENTS

| | | | |
|---|---|---|---|
| 4,428,075 | 1/1984 | Hazel et al. | 369/44.26 |
| 5,138,598 | 8/1992 | Sako et al. | 369/47 |
| 5,163,035 | 11/1992 | Horikiri | 369/44.13 |
| 5,185,732 | 2/1993 | Ogawa et al. | 369/47 |
| 5,210,738 | 5/1993 | Iwata et al. | 369/275.3 |
| 5,268,887 | 12/1993 | Honguh et al. | 369/275.3 |
| 5,272,692 | 12/1993 | Henderson et al. | 369/13 |
| 5,305,302 | 4/1994 | Hardwick | 369/275.3 |
| 5,339,301 | 8/1994 | Raaymakers et al. | 369/275.3 |

FOREIGN PATENT DOCUMENTS

| | | |
|---|---|---|
| 2-23532 | 1/1990 | Japan . |
| 2-193343 | 7/1990 | Japan . |

*Primary Examiner*—Nabil Z. Hindi
*Attorney, Agent, or Firm*—Ratner & Prestia

[57] ABSTRACT

An optical disk apparatus having rewritable optical disk with a spiral groove which is used as an information recording track. The track has two hard address mark areas formed once every rotation of the track around the center of the disk. The hard address mark areas are arranged in a single virtual straight line passing through the center of the disk to avoid crosstalk between recorded data and the hard address mark area. The track also has a periodic radial wobble groove containing frequency information at a specified period. A servo control circuit controls rotation of the disk at a constant linear velocity (CLV) in response to frequency information from the wobble groove. The hard address mark area and the wobble groove are pre-formed when pressing the disk. Sectors of equal length, where picture and sound information is recorded, are formed by recording a soft address mark signal produced in response to the hard address mark. The apparatus minimizes adverse effects due to crosstalk between reproduced data and the hard address mark. Therefore, high packing density recording of information can be achieved.

23 Claims, 4 Drawing Sheets

HARD ADDRESS AREA
24

ADDRESS
AREA 25

DATA AREA
26

OPTICAL DISK APPARATUS AND OPTICAL DISK HAVING A HARD ADDRESS MARK AREA

This application is a continuation of application Ser. No. 08/198,619 filed Feb. 18, 1994, now abandoned.

FIELD OF THE INVENTION

This invention relates to an optical disk apparatus and an optical disk for recording and reproducing digital video signals.

BACKGROUND OF THE INVENTION

Disks are recorded at either constant angular velocity (CAV) or constant linear velocity (CLV). FIG. 5 is an illustrative view for explaining the track pattern of the disk recorded in the CAV mode. In general, the track is divided into certain blocks referred to as a sector having a data area and an address mark area indicating a position which the data area is located on the disk. FIG. 5 shows eight sectors divided at equal angles. The hard address mark area 24 which separates the track into individual sectors is preformed when pressing the disk. The preformed hard address mark area 24 is arranged on a radial straight line of the disk so as to avoid cross talk from the address mark area to the data area. This cross talk has important effects on reconstruction of the data.

The disadvantage of CAV recording is that the storage capacity of the entire disk decreases because of the increase in tangential velocity at the outside radius than that of the inside radius and the resultant unnecessary increase in pit length at the outside radius.

On the other hand, since CLV recordings provide higher packing density in comparison to CAV recordings because of its constant linear velocity, it follows that the storage capacity increases. FIG. 6 is a schematic drawing for illustrating the track pattern of the disk recorded in the CLV mode. If the track is divided by the sectors having the same length, it becomes the layout that the address mark areas 25 are located in close proximity to the data areas 26 in the adjacent track as shown in FIG. 6. Because the information data recorded on the disk is picked out via that the optical head detects the microscopic optical variation in the incoming light beam from the disk surface, large cross talk from the hard address mark area in the adjacent track results in the increase in an error rate of the reproduced data. Consequently, the hard address mark areas, such as those preformed in the disk pressing which described in the CAV recording disk shown in FIG. 5, can not be used because there is the large cross talk from the hard address mark to the weak data area in the adjacent track.

SUMMARY OF THE INVENTION

A general object of the present invention is to provide a CLV optical disk apparatus and a CLV optical disk which are possible to minimize adverse effect due to cross talk from the address area about signals reproduced from the data area, having high packing density.

One preferred embodiment according to the present invention comprises:

A rewritable optical disk having a track including a hard address mark area, which is preformed when pressing the disk, formed at least one portion on said track every one revolution of the disk and arranged in a radical straight line of the disk;

read and write optical head means for reproducing information recorded on said rewritable optical disk and for recording a signal to be recorded on said rewritable optical disk;

servo control means for controlling rotation of said rewritable optical disk at a constant linear velocity mode;

hard address detecting means for detecting information recorded in said hard address mark area and position information of said hard address mark area;

soft address generating means for generating a soft address mark signal which divides a data area between said hard address mark areas into a sector having the same length;

mixing means for processing an information signal containing said soft address mark signal into signals per unit sector and outputting said information signal in accordance with an output signal from said hard address detecting means; and recording means for converting an output signal of said mixing means into said signal to be recorded.

And one preferred embodiment of an optical disk according to the present invention comprises:

a track has a hard address mark area, which is preformed when pressing the disk, formed at least one portion on said track every one revolution of the disk and arranged in a radical straight line of the disk; and said disk is a wobbling track having a specified period.

The invention itself, together with further objects and attendent advantages, will best be understood by reference to the following detailed description of the preferred embodiments, taken in conjunction with the accompanying drawings.

DESCRIPTION OF THE PREFERRED EMBODIMENTS

Figure 1:
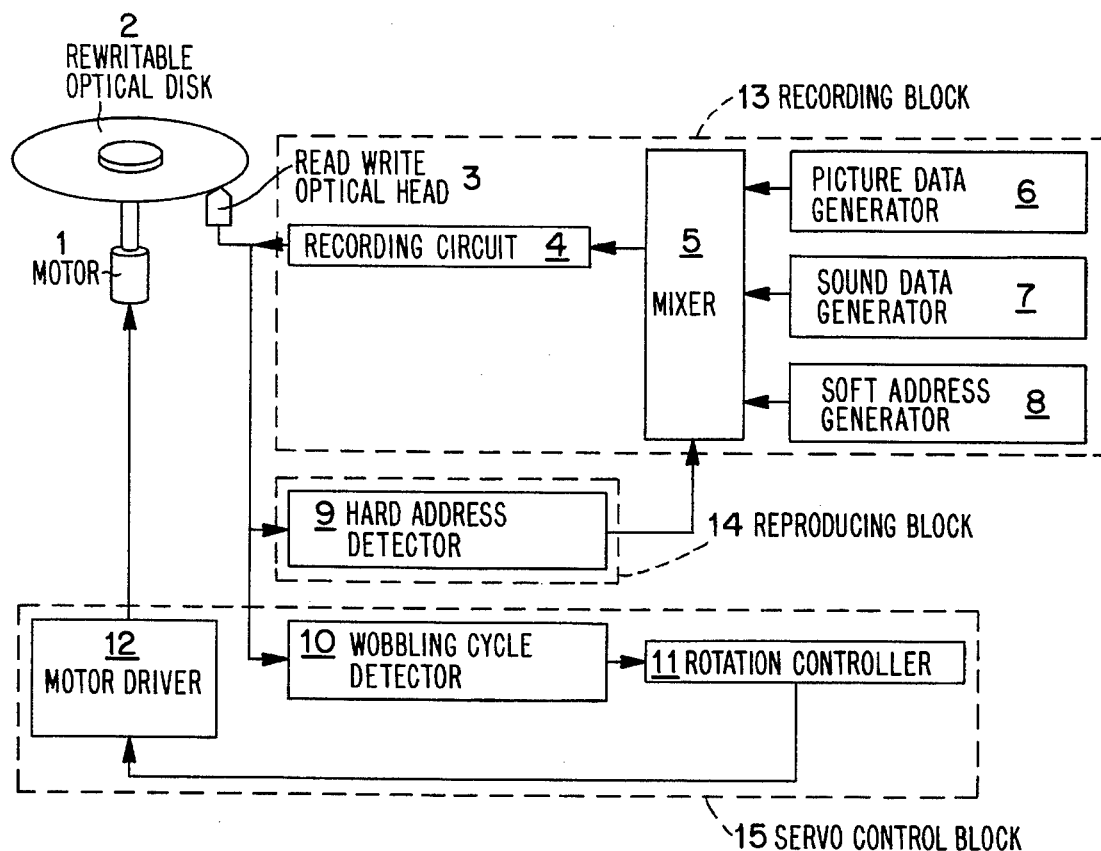
FIG. 1 is a block diagram of an embodiment of a rewritable optical disk apparatus according to the present invention.

Referring now to the drawings, an embodiment according to the present invention will be described in the paragraphs that follow. FIG. 1 is a block diagram of an embodiment of a rewritable optical disk apparatus according to the present invention.

In FIG. 1, peripheral devices of an optical disk are a rewritable optical disk 2, a motor 1 rotates the rewritable optical disk 2 at a constant linear velocity (CLV), and a read write optical head 8 for recording and reproducing information such as a picture data, a sound data, an address data, and the like. The prime constituents of a recording block 13 are a recording circuit 4, a mixer 5, a picture data generator 6, a sound data generator 7, and a soft address generator 8. A reproducing block 14 includes a hard address detector 9 for detecting the hard address mark area preformed when pressing the optical disk. A servo control block 15 comprises a wobbling cycle detector 10, a rotation controller 11, and a motor driver 12.

Referring to FIG. 1, a series of operations in this embodiment will be described. The read write optical head 3 picks up a hard address signal from the rewritable optical disk 2 being rotated by the motor 1, feeding the picked up hard address signal to the hard address detector 9. The hard address detector 9 produces a hard address position signal from the inputted hard address signal, feeding the produced hard address position signal to the mixer 5. In input terminals of the mixer 5, output signals of the picture data generator 6, sound data generator 7, and soft address generator 8 appear. The mixer 5 transforms the picture data, sound data, and soft address signals which are applied to the input terminal into signals per unit sector on the basis of the hard address position signal from the hard address detector 9, feeding the resultant signals to the recording circuit 4. The recording circuit 4 converts signals inputted from the mixer 5 into a signal for driving the optical head, supplying the converted signals to the read write optical head 3. The read write optical head 3 records the picture, sound, and address data transformed into the signal per unit sector on the rewritable optical disk.

The read write optical head 3 picks up a wobble signal from a wobble track which is formed on the rewritable optical disk, feeding the picked up wobble signal to the wobbling cycle detector 10. The wobbling cycle detector 10 detects a tangential velocity of the rewritable optical disk 2 by using the inputted wobble signal, feeding the detected tangential velocity information to the rotation controller 11. The rotation controller 11 controls the motor driver 12 driving the motor 1 so that the detected tangential velocity can agree with a specified tangential velocity.

Figure 2A:
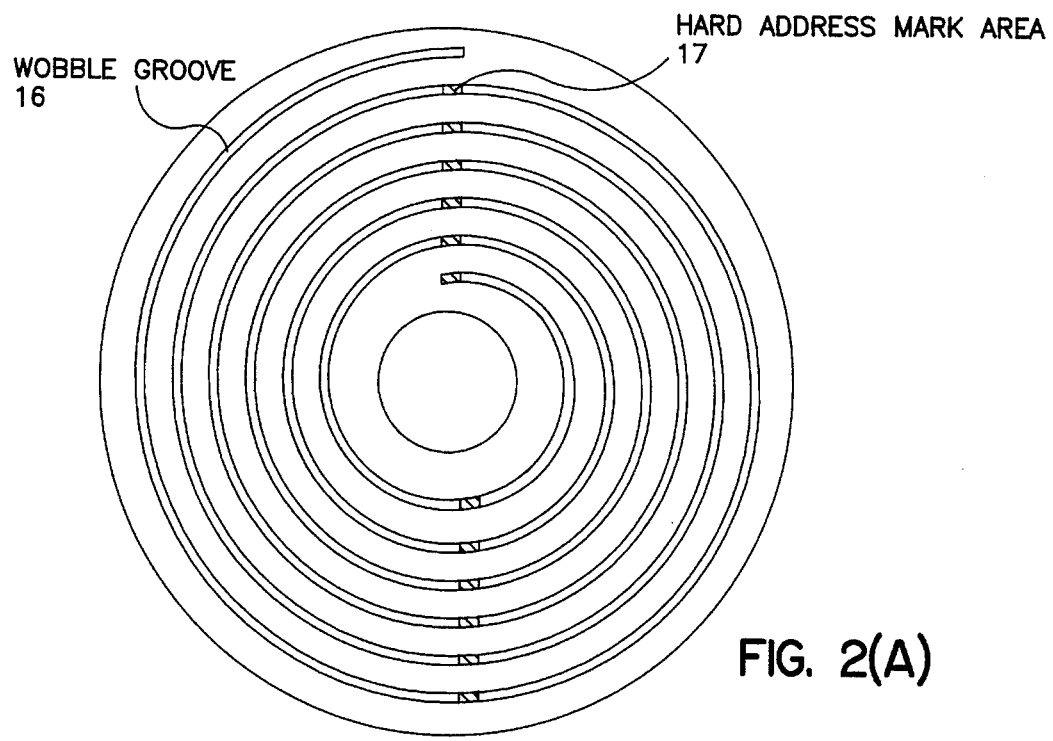
FIG. 2(A) is a schematic drawing for illustrating the track pattern preformed when pressing the rewritable optical disk which is used in the embodiment of the rewritable optical disk apparatus according to the present invention.

Referring now to FIG. 2, the recording operation on the rewritable optical disk will be explained. FIG. 2(A) is a schematic drawing for illustrating the track pattern preformed when pressing the rewritable optical disk which is used in the embodiment of the rewritable optical disk apparatus according to the present invention. The track has a wobble groove 16 which is radially wobbled a guide groove on the disk at a specified period. By detecting the tangential velocity information from the wobble groove 16, the servo control block 15 constitutes a continuous servo system for the CLV recording. The information data is recorded on a convex surface or a concave surface of the guide groove.

Figure 5:
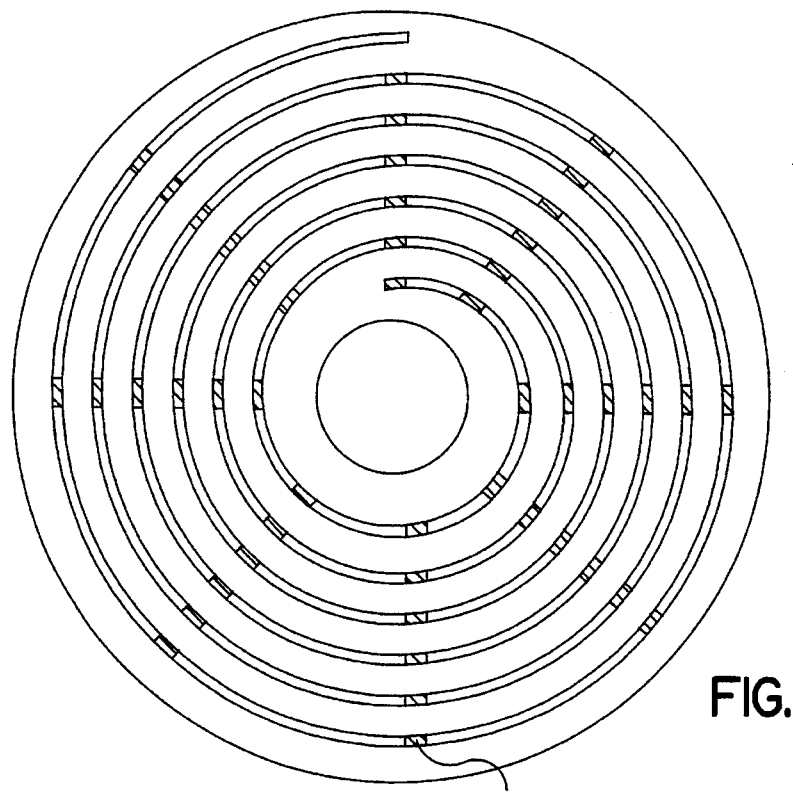
FIG. 5 is a schematic drawing illustrating the track pattern of conventional CAV recording optical disk.
Figure 6:
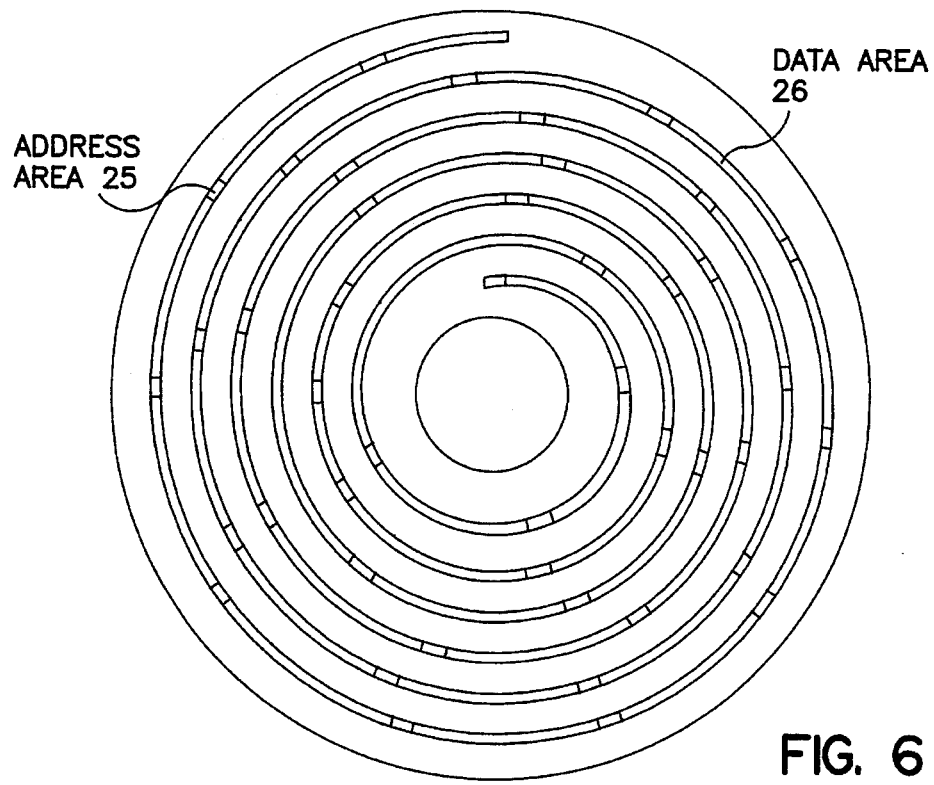
FIG. 6 is a schematic drawing illustrating the track pattern of conventional CLV recording optical disk.

In the track, there are two hard address mark area which is preformed when pressing the disk every one revolution of the disk and those are arranged in a radical straight line of the disk. Therefore, like the CAV recording disk illustrated in FIG. 5, the data area is not affected by the cross talk from the hard address mark area.

Figure 2B:
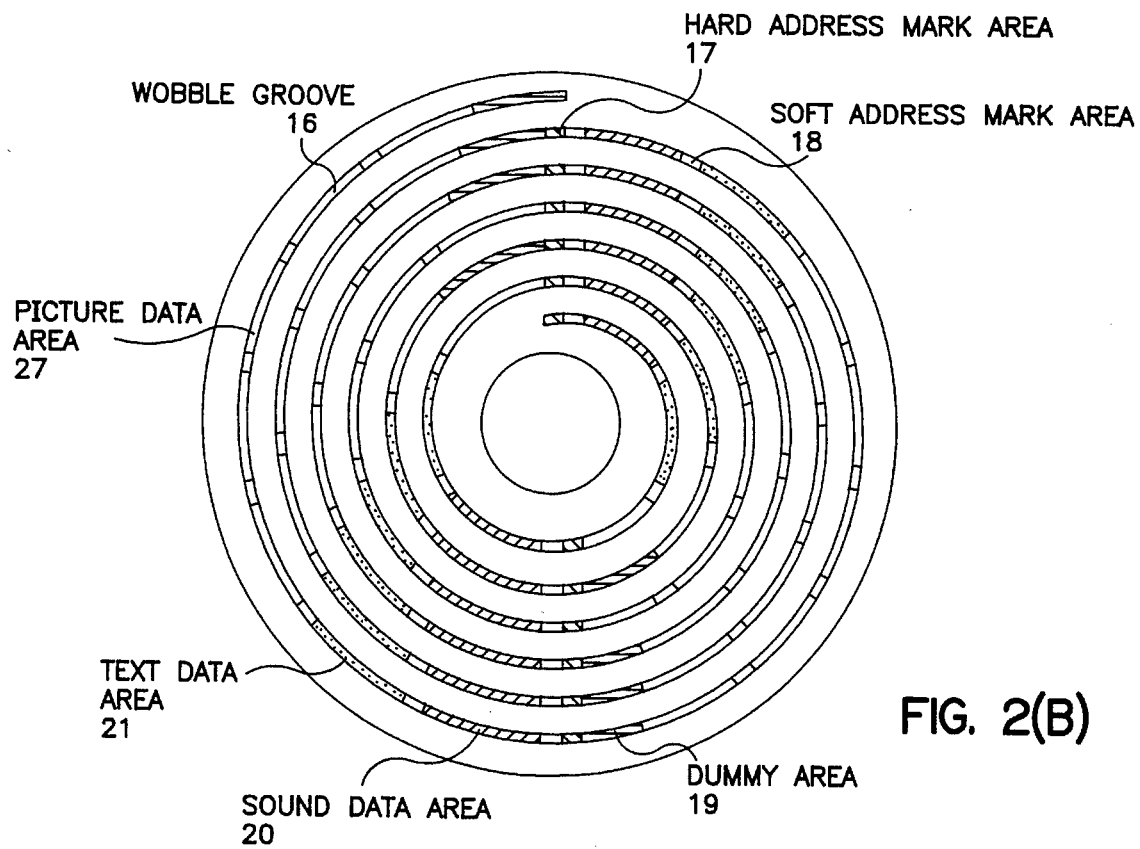
FIG. 2(B) is a schematic drawing of the track pattern recorded on the rewritable optical disk according to the embodiment.

FIG. 2(B) is a schematic drawing of the track pattern recorded on the rewritable optical disk 2 according to the present invention. As shown in FIG. 2(B), the data area between the hard address mark areas is divided in n(n=1, 2, 3,—, N) sectors which has the same length and a soft address mark area 18 is positioned for each sector. This arrangement is provided for the purpose of allowing the addressing to control finely. In the sector divided as above, an area not in excess of a normal length is placed just ahead of the hard address mark area as a dummy area.

Figure 3:
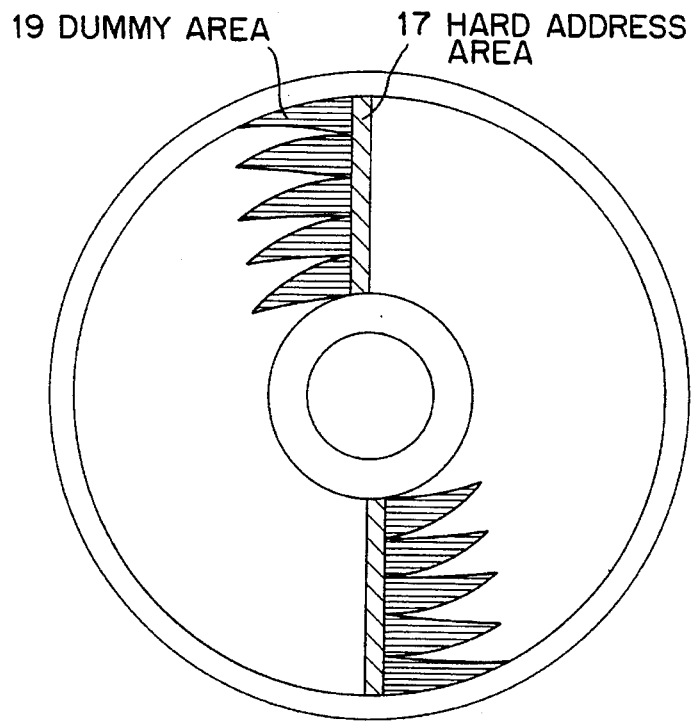
FIG. 3 is a schematic drawing illustrating the dummy area of the rewritable optical disk according to the embodiment.

If the entire track between the hard address mark area is occupied by the data sector having the normal length, the dummy area does not exist. As the radius of the track, however, is increased, it produces an increase in the length of the dummy area 19. When the length of the dummy area 19 reaches the normal length of the sector, it causes to replace the dummy area by a new sector area and then it follows that the dummy area 19 disappears from the track between the hard address mark areas. In this way, the state in which growth and disappearance in the length of the dummy area are repeated with saw-tooth-like form is shown in FIG. 3.

Since the ratio of the dummy area length for the entire track length is lowered by virtue of shortening the sector length, it follows that the storage capacity of the disk increases. However, it is also important to determine a proper length for particular purposes.

Figure 4A:
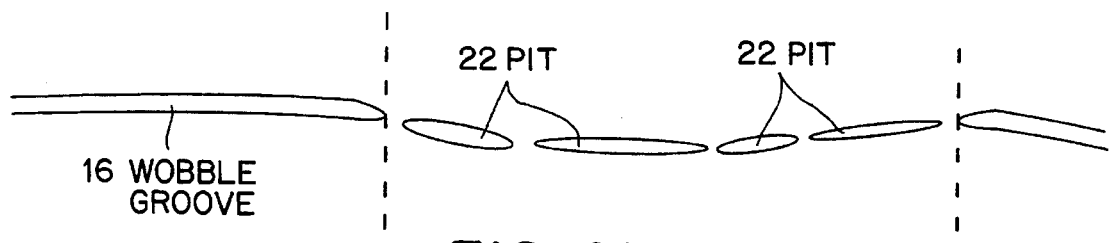
FIG. 4(A) and 4(B) is enlarged views illustrating examples of the hard address mark area preformed on the surface of the rewritable optical disk of the embodiment according to the present invention.
Figure 4B:
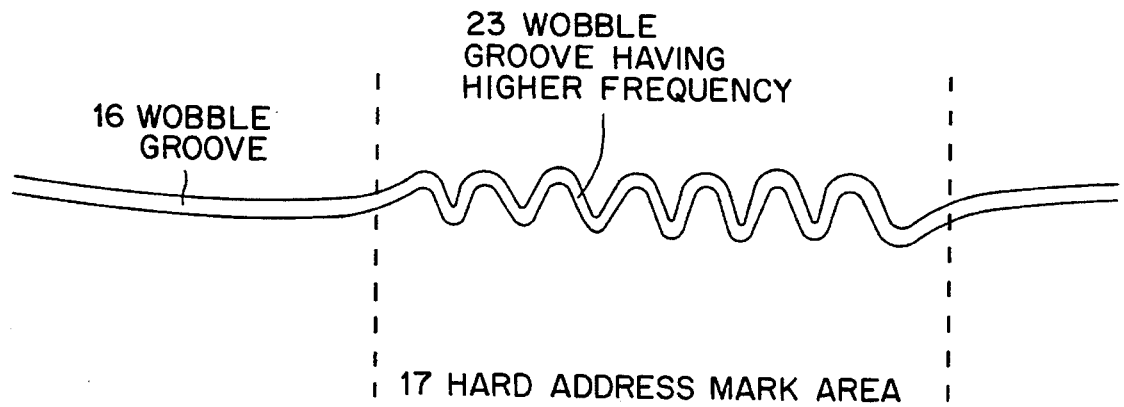

FIG. 4 shows examples of the forming of the hard address mark area shown in FIG. 2. FIG. 4(A) is an example in which a pit 22 is used and FIG. 4(B) is an example where a higher wobbling frequency is used.

By placing the sound data area 20 just behind the hard address mark area 17 as shown in FIG. 2(B), it produces an advantage which facilitates rewrite operation in the after recording. In addition, by placing the text data area 21 just behind the sound data area 20, it facilitates rewrite operation of captions.

The present invention may be embodied in other specific forms without departing from the spirit or essential characteristics thereof. The present embodiment is therefore to be considered in all respects as illustrative and not restrictive.

For example, numbers of the hard address mark area for one revolution of the disk and numbers of the soft address mark area between the hard address mark area are not restricted to the numbers described in the above embodiment.

Instead of velocity information detected from the wobble groove, it is also possible to perform CLV control by address information. In such cases, it is unnecessary to make the guide groove of the disk in the wobbling form.

The forming of the hard address mark area is not restricted to the pit form or higher wobbling frequency form. If only it can present the similar function, the shape of the hard address mark is arbitrary.

Existence of the sound data area and text data area is determined with reference to the application and it is allowed those allocation orders and position to set up in any other place accordance with specified rule as well as just ahead of the hard address mark areas.

What is claimed is:

1. An optical disk apparatus comprising:

a rewritable optical disk having a spiral groove which is used as a track for reproducing and recording digital information, said track including:

(a) hard address mark areas positioned exclusively at every intersection of said track and a single virtual straight line passing through the center of said rewritable optical disk, said hard address mark areas are pre-formed when pressing said rewritable optical disk and said hard address mark areas have hard address mark information, (b) a periodic radial wobble groove containing frequency information at a specified period, said periodic radial wobble groove is pre-formed when pressing said rewritable optical disk, and (c) data areas formed by partitioning said track with said hard address mark areas;

read and write optical head means for reproducing information on said track and for recording a signal to be recorded on said track;

servo control means for controlling rotation of said rewritable optical disk at a constant linear velocity in response to said frequency information from said periodic radial wobble groove;

hard address detecting means for detecting said hard address mark information and position information of said hard address mark areas, and producing an output signal;

soft address generating means for generating a soft address mark area signal which divides said data areas into a plurality of sectors, each sector having a predetermined equal length, wherein all of said data areas have one hard address mark area and two or more soft address mark areas;

mixing means for (a) processing an information signal to be recorded and said soft address mark area signal from said soft address generating means into signals having a length which can be recorded in one of said plurality of sectors in response to said output signal from said hard address detecting means, (b) positioning an area having a length less than said predetermined sector length in the proximity of said hard address mark area as a dummy area, and (c) producing a mixing signal which contains said processed information signal; and recording means for converting said mixing means into a write signal for said read and write optical head means.

2. The optical apparatus according to claim 1, wherein said mixing means further arranges sound data into one of said plurality of sectors located adjacent to said hard address mark areas in response to said output signal from said hard address detecting means.

3. A rewritable optical disk comprising:

a spiral groove which is used as a track for reproducing and recording digital information; and said track having:

(a) hard address mark areas positioned exclusively at every intersection of said track and a single virtual straight line passing through the center of said optical disk, said hard address mark areas are pre-formed when pressing said optical disk, and (b) a periodic radial wobble groove containing frequency information at a specified period, said periodic radial wobble groove is pre-formed when pressing said optical disk.

4. The rewritable optical disk according to claim 3, wherein said hard address mark areas have a pit form.

5. The rewritable optical disk according to claim 3, wherein said hard address mark areas are only formed on said track at said intersections.

6. The optical apparatus according to claim 1, wherein said hard address mark areas are only formed on said track at said intersections.

7. The rewritable optical disk according to claim 3, wherein there are two hard address mark areas within one revolution of said track.

8. The optical apparatus according to claim 1, wherein there are two hard address mark areas within one revolution of said track.

9. An optical disk apparatus comprising:

a rewritable optical disk having a spiral groove which is used as a track for reproducing and recording digital information, said track including:

(a) hard address mark areas positioned exclusively at every intersection of said track and a single virtual straight line passing a through the center of said rewritable optical disk, said hard address mark areas are pre-formed when pressing said rewritable optical disk and said hard address mark areas have hard address mark information, (b) a periodic radial wobble groove containing frequency information at a specified period, said periodic radial wobble groove is pre-formed when pressing said rewritable optical disk, and (c) data areas formed by partitioning said track with said a hard address mark areas;

read and write optical head means for reproducing information on said track and for recording a signal to be recorded on said track;

hard address detecting means for detecting said hard address mark information and position information of said hard address mark areas, and producing an output signal;

soft address generating means for generating a soft address mark area signal which divides said data areas into a plurality of sectors wherein all of said data areas have one: hard address mark area and two or more soft address mark areas;

mixing means for (a) processing an information signal to be recorded and said soil address mark area signal from said soft address generating means into signals having a length which can be recorded in one of said plurality of sectors in response to said output signal from said hard address detecting means and (b) producing a mixing signal which contains said processed information signal; and recording means for converting said mixing signal from said mixing means into a write signal for said read and write optical head means.

10. An optical disk apparatus comprising:

a rewritable optical disk having a spiral groove which is used as a track for reproducing and recording digital information, said track including:

(a) hard address mark areas positioned exclusively at every intersection of said track and a single virtual straight line extending through the center of said rewritable optical disk, to an outer side of said optical disk, said hard address mark areas are pre-formed when pressing said rewritable optical disk and said hard address mark areas have hard address mark information, (b) a periodic radial wobble groove containing frequency information at a specified period, said periodic radial wobble groove is pre-formed when pressing said rewritable optical disk, and (c) data areas formed by partitioning said track with said hard address mark areas;

read and write optical head means for reproducing information on said track and for recording a signal to be recorded on said track;

servo control means for controlling rotation of said rewritable optical disk at a constant linear velocity in response to said frequency information from said periodic radial wobble groove;

hard address detecting means for detecting said hard address mark information and position information of said hard address mark areas; and producing an output signal;

soft address generating means for generating a soft address mark area signal which divides said data areas into a plurality of sectors, each sector having a predetermined equal length, wherein all said data areas have one hard address mark area and two or more soft address mark areas;

mixing means for (a) processing an information signal to be recorded and said soft address mark area signal from said soft address generating means into signals having a length which can be recorded in one of said plurality of sectors in response to said output signal from said hard address detecting means, (b) positioning an area having a length less than said predetermined sector length in the proximity of said hard address mark area as a dummy area, and (c) producing a mixing signal which contains said processed information signal; and recording means for converting said mixing means into a write signal for said read and write optical head means.

11. The optical apparatus according to claim 10, wherein said mixing means further arranges sound data into one of said plurality of sectors located adjacent to said hard address mark areas in response to said output signal from said hard address detecting means.

12. A rewritable optical disk comprising:

a spiral groove which is used as a track for reproducing and recording digital information; and said track having:

(a) hard address mark areas positioned exclusively at every intersection of said track and a single virtual radial straight line extending through the center of said optical disk to an outer side of said optical disk, said hard address mark areas are pre-formed when pressing said optical disk, and (b) a periodic radial wobble groove containing frequency information at a specified period, said periodic radial wobble groove is pre-formed when pressing said optical disk.

13. The rewritable optical disk according to claim 12, wherein said hard address mark areas have a pit form.

14. The rewritable optical disk according to claim 12, wherein said hard address mark areas are only formed on said track at said intersections.

15. The optical apparatus according to claim 10, wherein said hard address mark areas are only formed on said track at said intersections.

16. The rewritable optical disk according to claim 12, wherein there is said single virtual radial straight line extending from the center of said optical disk and there is one hard address mark areas within one revolution of said track.

17. The optical apparatus according to claim 10, wherein there is said single virtual radial straight line extending from the center of said optical disk and there is one hard address mark areas within one revolution of said track.

18. An optical disk apparatus comprising:

a rewritable optical disk having a spiral groove which is used as a track for reproducing and recording digital information, said track including:

(a) hard address mark areas positioned at every intersection of said track and a single virtual radial straight line extending through the center of said rewritable optical disk to an outer side of said optical disk, said hard address mark areas are pre-formed when pressing said rewritable optical disk and said hard address mark areas have hard address mark information, (b) a periodic radial wobble groove containing frequency information at a specified period, said periodic radial wobble groove is pre-formed when pressing said rewritable optical disk, and (c) data areas formed by partitioning said track with said hard address mark areas;

read and write optical head means for reproducing information on said track and for recording a signal to be recorded on said track;

servo control means for controlling rotation of said rewritable optical disk at a constant linear velocity in response to said frequency information from said periodic radial wobble groove;

hard address detecting means for detecting said hard address mark information and position information of said hard address mark areas, and producing an output signal;

soft address generating means for generating a soft address mark area signal which divides said data areas into a plurality of sectors, each sector having a predetermined equal length, wherein all said data areas have one hard address mark area and two or more soft address mark areas;

mixing means for (a) processing an information signal to be recorded and said soft address mark area signal from said soft address generating means into a signals having a length which can be recorded in one of said plurality of sectors in response to said output signal from said hard address detecting means and (b) positioning an area having a length less than said predetermined sector length in the proximity of said hard address mark area as a dummy area, and (c) producing a mixing signal which contains the said processed information signal; and recording means for converting said mixing signal from said mixing means into a write signal for said read and write optical head means.

19. The optical apparatus according to claim 18, wherein said mixing means further arranges sound data into one of said plurality of sectors located adjacent to said hard address mark areas in response to said output signal from said hard address decccting means.

20. A rewritable optical disk comprising:

a spiral groove which is used as a track for reproducing and recording digital information; and said track having;

(a) hard address mark areas positioned at every intersection of said track and a single virtual radial straight line extending through the center of said optical disk to an outer side of said optical disk, said hard address mark areas are pre-formed when pressing said optical disk, and (b) a periodic radial wobble groove containing frequency information at a specified period, said periodic radial wobble groove is pre-formed when pressing said optical disk.

21. The rewritable optical disk according to claim 20, wherein said hard address mark areas have a pit form.

22. The rewritable optical disk according to claim 20, wherein said hard address mark areas are only formed on said track at said intersections.

23. The optical apparatus according to claim 18, wherein said hard address mark areas are only formed on said track at said intersections.

* * * * *

UNITED STATES PATENT AND TRADE MARK OFFICE
CERTIFICATE OF CORRECTION

PATENT NO.   : 5,568,459
DATED         : October 22, 1996
INVENTOR(S) : Takamori et al.

It is certified that error appears in the above-identified patent and that said Letters Patent is hereby corrected as shown below:

Column 6, line 27, after the word "one" delete the colon ":".

Column 6, line 30, delete the word "soil" and insert --soft--.

Column 7, line 1, after the word "areas" delete the semicolon ";" and insert a comma --,--.

Column 7, line 18, between the words "which" and "contains" delete the hyphen "-".

Signed and Sealed this

Eighth Day of April, 1997

Attest:

BRUCE LEHMAN

*Attesting Officer*    *Commissioner of Patents and Trademarks*